Aug. 17, 1954
R. L. DORT
2,686,522
MATERIAL-HANDLING MEANS, ESPECIALLY FOR
CORN HUSKING AND CONVEYING MECHANISMS
Original Filed May 26, 1949
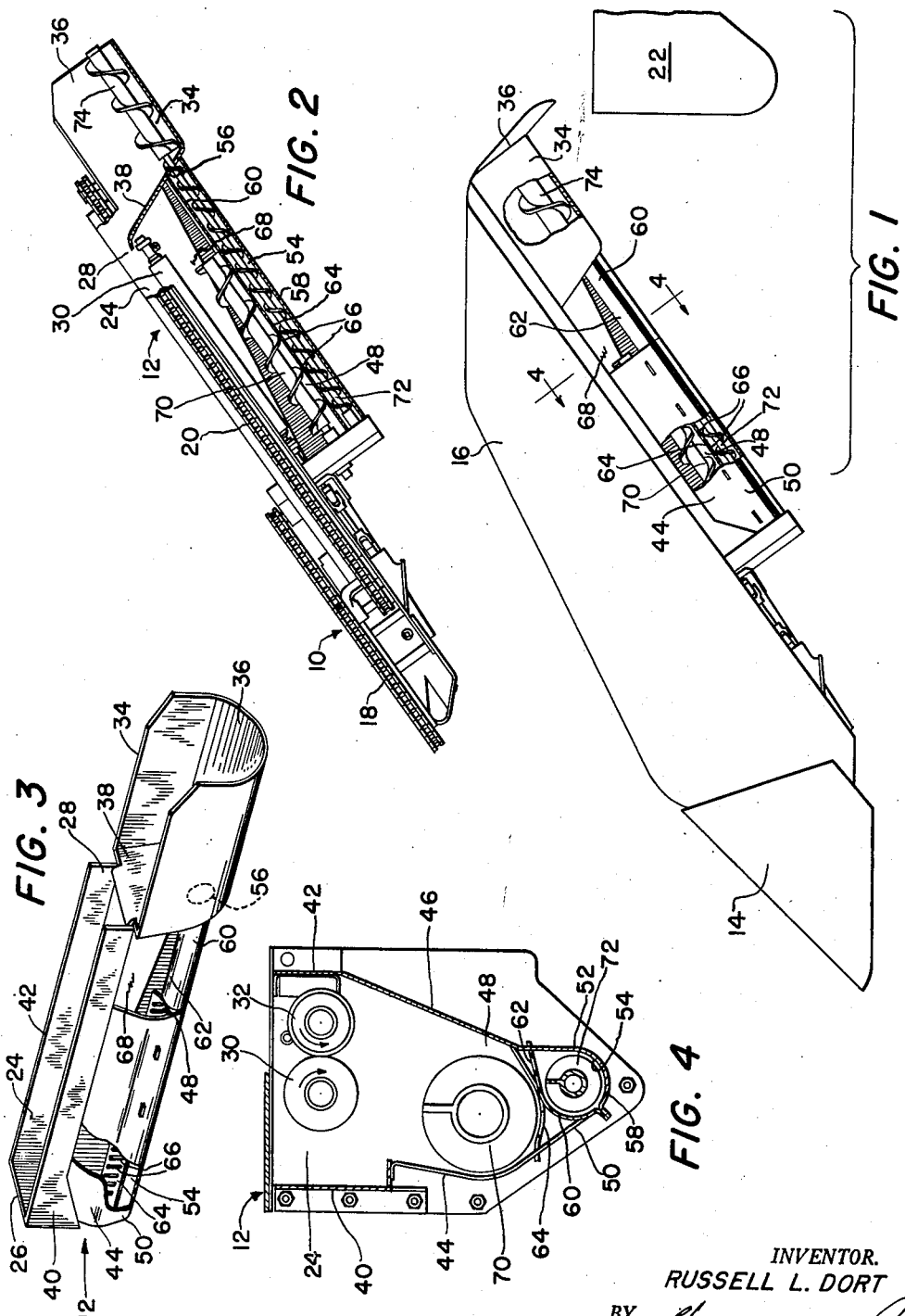
INVENTOR.
RUSSELL L. DORT
BY 
ATTORNEY Patented Aug. 17, 1954

2,686,522

UNITED STATES PATENT OFFICE 2,686,522

MATERIAL-HANDLING MEANS, ESPECIALLY FOR CORN HUSKING AND CONVEYING MECHANISMS

Russell L. Dort, Davenport, Iowa, assignor to Deere & Company, Moline, Ill., a corporation of Illinois Continuation of application Serial No. 95,508, May 26, 1949. This application March 8, 1952, Serial No. 275,535

11 Claims. (Cl. 130—5)

This application is a continuation of application Serial No. 95,508, filed May 26, 1949, and now abandoned, and the invention relates to improved means for separating, conveying and otherwise handling material, particularly in connection with the corn husking mechanism of a corn harvester or like machine.

The ordinary corn harvester, as an example of what has gone before, includes means for snapping ears from standing stalks and transferring these ears to a husking unit which includes a plurality of rotatable rolls operative to separate the husks from the ears. The ears are discharged over one end of the husking unit and the husks are discharged downwardly between the rolls. Reduced to its simplest form, the mechanism operates to discharge the ears to an elevator or conveyor for ultimate discharge to a wagon, and the husks may be discharged directly upon the ground. However, the husking operation causes considerable shelling of the corn and discharging through the bottom of the husking unit would result in a waste of such shelled corn. Therefore, it becomes necessary to provide means communicable with the husking unit for receiving the husks and shelled corn, or other finer material, and for separating the material so received so that the husks may be discharged upon the ground and the shelled corn saved. There is still the further problem of discharging the shelled corn to a suitable receptacle. Normally, such suitable receptacle is the means that ultimately receives the husked ears.

However, the problem of arranging the parts so that they function efficiently and at the same time accomplish the necessary results is no small one, particularly since the design in most cases requires a compact unit for mounting on a tractor or similar wheeled vehicle. Necessarily, cost is an important item, as are simplicity and ease of maintenance.

According to the present invention, one of the principal objects is to provide an improved structure or arrangement of the type generally referred to above, characterized in that the means for transferring the shelled corn to the receptacle that ultimately receives the husked ears includes common means for handling both the shelled corn and the husked ears. Preferably, the arrangement is such that a tubular structure extends from such part of the husking unit as will effect the discharge of shelled corn to such structure, to the means that initially receives the husked ears from the husking unit. This tubular structure is provided with an auger for moving or transferring the shelled corn from the receiving end of the tubular structure to the discharge end thereof which is in communication with the husked-ear-receiving means. It is another feature of the invention to extend the auger or transfer means into the husked-ear-receiving means so that the auger serves also to move husked ears out of the receiving means. Still further, it it a feature of the invention to enlarge the husked-ear-receiving means and to provide an enlarged coaxial extension on the auger cooperative with such enlarged portion of the husked-ear-receiving means. Yet another object of the invention is to simplify the design of the material-handling mechanism so that it may be inexpensively manufactured, efficiently used and easily maintained.

The foregoing and other important objects and desirable features inherent in and encompassed by the invention will become apparent to those versed in the art as a preferred embodiment of the invention is described in detail in the following description and illustrated in the accompanying sheet of drawings.

In the drawings:

Figure 1 is a side elevational view of part of a corn harvester embodying the invention, portions of the structure being broken away to expose inner parts thereof;

Figure 2 is a longitudinal sectional view of the structure shown in Figure 1;

Figure 3 is a perspective view of the casing structure, the transfer elements or augers having been omitted; and Figure 4 is an enlarged transverse sectional view taken substantially on the line 4—4 of Figure 1.

The invention is illustrated in connection with its use as part of a row unit for a corn picker of the type adapted to be mounted on a tractor or similar wheeled vehicle. It will be understood, of course, that the principles of the invention have wider application apart from the precise illustration. Further, reference in the specification and in the appended claims to the parts as having upper and lower or front and rear ends is for the purpose of clarity; obviously, the parts may have shapes and proportions and may be disposed in directions or positions other than those illustrated. Accordingly, the disclosure of a preferred embodiment of the invention should be taken as illustrative and not limiting.

The row unit illustrated comprises a forward snapping and gathering component 10 behind which is disposed a husking or handling component 12 (Figure 2). Normally, as shown in Figure 1, these components are enclosed with appropriate shielding including a forward gathering point 14 and a rearwardly and upwardly extending enclosure structure 16.

The snapping and gathering component includes appropriate gathering chains, one of which is shown at 18 in Figure 2, suitable snapping rolls (not shown, but which are conventional) for snapping corn from standing stalks and ultimately delivering it to the husking component 12. The transfer of corn from the gathering and snapping component 10 and to the husking component 12 is accomplished by means including a rearwardly and upwardly running first elevator chain 20. The husking component 12 discharges rearwardly to a receptacle in the form of a hopper 22 (Figure 1) and from here the corn is carried by appropriate means to a suitable receptacle, such as a trailer or wagon (not shown).

Since the means for gathering and snapping corn and for transferring the corn to the husking component form no part of the present invention, they will not be further described, it being understood that the invention may be utilized with any mechanism other than that illustrated or may be utilized in connection with a machine that is simply a corn husker.

The husking component 12 includes casing structure having an upper portion providing a husking compartment 24 which is elongated front to rear and which has a front end 26 and a rear or discharge end 28. The front end 26 is located immediately to the rear of the snapping and gathering component 10 and snapped ears are delivered to the husking unit at this point. The husking unit further includes a pair of elongated rolls 30 and 32 (Figure 4) which are suitably journaled for rotation in the direction of the indicating arrows.

These rolls extend lengthwise substantially throughout the length of the compartment 24 and operate to remove husks from ears of corn delivered to the rolls at the forward end of the compartment. The first elevator chain 20, as is conventional, may include means for assisting the rearward movement of the ears over the rolls 30 and 32 toward the rear discharge end 28 of the unit. At this point the husking component is provided with means forming a husked-ear-receiving receptacle 34. This receptacle is in the form of a trough that is relatively wide and deep and comparatively short and that opens upwardly to communicate with the discharge end 28 of the compartment 24 and opens rearwardly at 36 to provide an outlet for discharge of the husked ears to the hopper or receptacle 22. The entire casing structure is preferably formed of sheet metal and the elements thereof may be secured together in any suitable manner. The junction of the husked-ear-receiving means or trough 34 with the husking compartment 24 is effected by transverse imperforate wall or shield means 38 which extends substantially from the bottom of the trough 34 to the discharge end 28 of the husking compartment 24.

The husking compartment 24 is defined by a pair of transversely spaced, longitudinally extending side walls 40 and 42 which adjoin or extend downwardly to a pair of downwardly converging, longitudinally extending walls 44 and 46 which are arranged to define a first trough 48 positioned substantially directly below and underlying the husking compartment 24. Since the bottom of the husking compartment 24 is open, husks and other material removed from the ears by the husking rolls will be discharged downwardly to be received by the trough 48. This trough will be hereinafter referred to as the husk trough. The husking unit thus has two discharge openings or portions, one at 28 (and over the wall 38) and the other through the open bottom or between the rolls 30 and 32.

The walls 44 and 46 converge or extend further downwardly at 50 and 52 to define a second trough 54 which underlies the husk trough 48. The second trough will be referred to hereinafter as the shelled-corn trough. A major portion of the shelled-corn trough is coextensive with the husk trough 48, but the former extends further rearwardly than the latter; and, whereas the wall 38 is imperforate as respects the rear end of the trough 48 and as such serves to exclude husks, it has a circular opening 56 by means of which the shelled-corn trough 54 communicates with the husked-ear trough 34. The wall 52 that forms the trough 54 curves downwardly and outwardly at 58 to enclose the bottom of the trough. A substantial part of the forward portion of the trough 54 is closed at one side by the wall portions 50 and 44 which are common to both troughs 48 and 54. However, immediately ahead of the separating wall 38, the side and upper portions of the trough 54 are enclosed by imperforate shield means comprising a husk-excluding shield of arcuate cross section, best shown at 60 in Figures 3 and 4. This shield has an upwardly and inwardly inclined surface 62 that adjoins the inner surface of the inner wall 52 (Figures 3 and 4).

The troughs 48 and 54 are separated throughout a substantial portion of their length by means providing a bottom structure for the trough 48 and a top structure for the trough 54. This structure is preferably in the form of a perforated wall 64 of slightly arcuate cross section (Figures 3 and 4), the perforations comprising a plurality of diagonal slits 66. This wall 64 is substantially an extension of the upper surface portion 62 of the enclosure shield 60 (Figures 3 and 4).

The perforations 66 in the wall or structure 64 provide for the separation in the trough 48 of husks and finer material such as shelled corn, the latter being screened and falling through to move in an individual stream carried by the shelled-corn trough 54. The perforations are, of course, too small to permit escape therethrough of husks and these husks remain in a separate stream and must be discharged rearwardly through a husk-discharge outlet at the rear end of the trough 48. This discharge outlet or end is designated by the numeral 68 and is defined by the junction of the perforate wall 64 with the imperforate wall or shield 60, and is further defined by the rear terminal end of the side wall 44—50. The termination of the side wall at the point referred to provides an opening in the side of the husk trough 48 substantially coextensive with the longitudinal extent of the shield 60. Hence, whereas the husk trough terminates at 68, the shelled-corn trough 54 continues beyond or by-passes 68 and enters the ear-receiving zone or trough 34 via the opening 56. Therefore, shelled corn and other finer material finding its way into the trough 54 may ultimately be transferred to the trough 34, the latter providing, in effect, a trough extension of the trough 54. Since the trough extension 34 handles ears, it has a larger cross sectional area or shape than does the smaller shelled-corn auger 54.

The discharge portion at 68 for the husk trough 48 is separate from the discharge portion or outlet established by the slits 66 in the perforated dividing wall 64. However, whereas the trough 54 communicates with the trough 48 for the purpose of receiving shelled corn or other finer material, the trough 54 is separate or closed off from the discharge end 68 of the trough 48 by means of the shield or enclosure structure 60. Likewise, the discharge end 68 of the trough 48 is closed off at 38 from the ear-receiving trough 34. Hence, any material not received by either the trough 54 or the trough 34 is discharged at 68 outwardly upon the ground, such discharge being, of course, separate from shelled corn which, as will be hereinafter more fully explained, finds its way to the hopper 22.

The means for separating husks from shelled corn and other finer material comprises, in addition to the perforated wall 64, means for moving this stream of material rearwardly toward the discharge opening 68. This means preferably comprises an auger 70 which terminates substantially at the opening 68. As the auger operates to move the husks and shelled corn rearwardly, the shelled corn and other finer material drop through the slits 66 to the trough 54 and the husks are conveyed rearwardly and discharged outwardly upon the shield 60. Since this shield encloses the intermediate portion of the trough 54 between 68 and 38, the discharged husks cannot enter the trough 54. The inclination of the surface 62 facilitates such lateral discharge.

An important feature of the invention lies in the means that is common to both the trough 54 and trough extension 34 for effecting movement of shelled corn and finer material from the trough 54 rearwardly through the opening 56 to the trough extension 34 and also for effecting movement of the ears received in the trough extension so that both such finer material, including shelled corn, and ears are discharged outwardly or rearwardly at 36 to the hopper 22. This common means comprises a second auger 72 which extends throughout the length of the shelled-corn trough 54 and which enters the opening 56 to extend into the ear trough 34. The auger includes as a coaxial extension thereof an auger portion 74 which, because of the increased size of the trough extension 34 over the trough 54, is of larger diameter than the auger portion 72.

The operation of the mechanism will, it is believed, be apparent from the foregoing description, as will various of the characteristics of the invention that provide for the improved and simplified construction. Other objects and features of the invention, not specifically pointed out above, will undoubtedly occur to those versed in the art, as likewise will numerous modifications and alterations in the preferred structure illustrated, all of which may be achieved without departing from the spirit and scope of the invention as defined in the appended claims.

What is claimed is:

1. In a corn harvester or the like having husking means over which corn is moved from a receiving end to an ear-discharge end and which operates to remove husks and discharge them downwardly and apart from the ears, the improvement comprising: means providing a husk trough positionable to underlie the husking means for receiving husks therefrom and having an open husk-discharge end terminating short of the ear-discharge end of the husking unit, and further having a perforated bottom for separating shelled corn and retaining husks; means providing a shelled-corn trough underlying and in shelled-corn-receiving relation to the husk trough and extending beyond said husk-discharge end to a shelled-corn-discharge portion below the ear-discharge end of the husking means, and further having separating shield means provided generally as an extension of said perforated bottom and enclosing that upper portion of the shelled-corn trough that extends beyond said husk-discharge end so that the husk trough may discharge over and across said shield means apart from the shelled-corn trough; means providing an ear trough generally in alined communication with the shelled-corn trough, but separate from the husk-discharge end of the husk trough, and positioned below and in ear-receiving relation to the ear-discharge end of the husking means; husk-moving means for moving husks over the perforated bottom and to the husk-discharge end of the husk trough; shelled-corn-moving means for moving shelled corn along the shelled-corn trough, under the shield means and into the ear trough; and said shelled-corn-moving means including an extension in the ear trough for moving both shelled corn and ears along the ear trough.

2. The invention defined in claim 1, further characterized in that: the husk-moving means is an auger terminating at the separating shield means; and the shelled-corn-moving means is an auger within the shelled-corn trough and including a coaxial extension projecting into and extending along the husked-ear trough.

3. The invention defined in claim 1, further characterized in that: said husked-ear trough has a larger cross-section than the shelled-corn trough; and said coaxial extension comprises an auger portion of larger diameter than the auger portion in the shelled-corn trough.

4. In a corn harvester or the like having husking means over which corn is moved from a receiving end to an ear-discharge end and which operates to remove husks and discharge them downwardly and apart from the ears, the improvement comprising: means providing a husk trough positionable to underlie the husking means for receiving husks therefrom, said husk trough extending toward, and having a husk-discharge end terminating short of the ear-discharge end of the husking unit, and further having a perforated bottom for separating shelled corn and retaining husks; means providing a shelled-corn trough underlying and in shelled-corn-receiving relation to the husk trough and extending beyond said husk-discharge end to a shelled-corn discharge portion below the ear-discharge end of the husking means, and further having separating shield means enclosing that upper portion of the shelled-corn trough that extends beyond said husk-discharge end so that the husk trough may discharge over and across said shield means apart from the shelled-corn trough; and means providing immediately adjacent the ear-discharge end of the husking means and immediately adjacent the discharge end of the shelled-corn trough a receiving zone in which the paths of discharge husked ears and discharged shelled corn merge, including an imperforate portion cooperating with the aforesaid shield means to exclude discharged husks from said zone and further including a husked-ear inlet communicating with the ear-discharge end of the rolls and a shelled-corn inlet passage communicating with the discharge end of the shelled-corn trough.

5. In a corn harvester or the like having husking means over which corn is moved from a receiving end to an ear-discharge end and which operates to remove husks and discharge them downwardly and apart from the ears, the improvement comprising: means providing a husk trough positionable to underlie the husking means for receiving husks therefrom, said husk trough extending toward, and having a husk-discharge end terminating short of the ear-discharge end of the husking unit, and further having a perforated bottom for separating shelled corn and retaining husks; means providing a shelled-corn trough underlying and in shelled-corn-receiving relation to the husk trough and extending beyond said husk-discharge end to a shelled-corn-discharge portion below the ear-discharge end of the husking means, and further having separating shield means enclosing that upper portion of the shelled-corn trough that extends beyond said husk-discharge end so that the husk trough may discharge over and across said shield means apart from the shelled-corn trough; means including a plate element transverse to and extending from the discharge portion of the shelled-corn trough to the ear-discharge end of the husking means, said plate element having an opening therein alined and in shelled-corn-transfer relationship with the discharge portion of the shelled-corn trough, and said plate element cooperating with said separating shield means in spaced relation to the discharge end of the husk trough to deflect discharged husks transversely to the path of discharge movement of shelled corn.

6. A husking box for a corn picker or the like, comprising: means providing a husking compartment having front and rear ends and an open bottom and adapted to receive unhusked ears of corn and to separate ears from husks, said rear end providing for the discharge of husked ears; means providing a first trough below and generally coextensive with the compartment for receiving husks and shelled corn through the bottom of the husking compartment; means providing a second trough below and substantially coextensive with the first trough, and including a generally alined trough extension beyond and opening upwardly to receive husked ears from the rear end of the husking compartment; separating wall means extending upwardly from the bottom of the trough extension substantially to the rear end of the husking compartment and disposed transversely of and at the junction of the second trough and the trough extension to separate the trough extension from the first trough but having an opening therethrough by means of which the second trough communicates with the trough extension; means providing a bottom structure for the first trough which serves also as a top structure for the second trough, said structure extending between the front ends of the troughs to the separating wall means and including a forward perforate portion over the second trough for passing shelled corn and excluding husks and a rearward husk-excluding portion adjoining the separating wall means about the opening therein; and means providing an opening in the side of the first trough ahead of the separating wall means substantially coextensive with said rearward husk-excluding portion.

7. In a corn harvester or the like having a husking unit provided with inlet and outlet ends and an open bottom, and means for husking ears of corn and for discharging husked ears at the outlet end and husks and shelled corn through the bottom, the improvement comprising: a first trough beneath and for receiving husks and shelled corn from the open bottom, said trough having a closed end and an open end respectively at the inlet and outlet ends of the husking unit, said trough having a perforate bottom extending from end to end thereof and through which shelled corn is passed; means providing substantially an imperforate extension of said perforated bottom beyond and below the open end of the first trough; a second trough beneath the first trough for receiving shelled corn from the perforate bottom and extending below the perforate bottom and below said imperforate extension and having an outlet end beyond the outlet end of the first trough; and shield means extending from the outlet end of the husking unit to the outlet end of the second trough and adjoining the aforesaid imperforate extension to partition the outlet end of the first trough from the outlet ends of the husking unit and second trough.

8. The invention defined in claim 7, further characterized in that the second trough includes a trough extension through the shield means and below the outlet end of the husking unit in position to receive husked ears from said outlet end of the husking means.

9. The invention defined in claim 8, further characterized in that: the trough extension is larger than the second trough; an auger shaft extends lengthwise over the second trough and trough extension and through the shield means; an auger is carried on the shaft in the second trough and terminates substantially at the shield means; and an auger extension is carried by the shaft in the trough extension, said auger extension being of larger diameter than the auger.

10. In a corn harvester or the like having a husking unit provided with an opening through which are discharged husks and incidental finer material and provided also with an ear-discharge outlet through which husked ears are transferred to a husked-ear-receiving zone, the improvement comprising: inclined receiving means communicable with the husk and finer material opening and including means for separating the husks and finer material into two separate streams; a pair of means separately communicable with the separating means for receiving the husks and finer material in said separate streams and for conveying the streams separately and in the same uphill direction toward the husked-ear-receiving zone; means providing a husk-discharge outlet at the uphill end of the husk-conveying means and just short of the husked-ear-receiving zone and offset therefrom crosswise of the direction of movement of said streams; means adjacent to the husk-discharge outlet and positioned to intercept the husk stream for diverting the husk stream away from the husked-ear-receiving zone and to said husk-discharge outlet; and means including an uphill extension of the finer-material conveying means, by-passing the husk-discharge outlet means and leading into the husked-ear-receiving zone for directing the finer-material stream into said zone.

11. In a corn harvester or the like having husking means over which corn is moved along a path from a receiving end to an ear-discharge end and which operates to remove husks and discharge them separately from the ears in a direction transverse to the aforesaid path, the improvement comprising: a husk conveyor positionable adjacent to and communicating with the husking means for receiving husks and leading to an open husk-discharge end separate from the ear-discharge end of the husking means, and further having a perforated wall element for separating shelled corn from the husks; a shelled-corn conveyor communicating with and for receiving shelled corn from the husk conveyor via said perforated wall element; said shelled-corn conveyor including an extension projecting beyond the ear-discharge end of the husking means and structurally separated from the husk-discharge end of the husk conveyor to receive husked ears from the husking means so that the husked ears and shelled corn are re-commingled and commonly conveyed by said shelled-corn conveyor extension; and said extension having a discharge end from which said re-commingled husked ears and shelled corn are commonly discharged to the exclusion of husks.

References Cited in the file of this patent

UNITED STATES PATENTS

| Number | Name | Date |
|---|---|---|
| 1,151,876 | Hawk | Aug. 31, 1915 |
| 2,298,198 | Coultas | Oct. 6, 1942 |
| 2,337,592 | Coultas | Dec. 28, 1943 |
| 2,419,898 | Johnson | Apr. 29, 1947 |
| 2,420,543 | Johnson | May 13, 1947 |
| 2,424,181 | Messenger et al. | July 15, 1947 |
| 2,427,861 | Johnson | Sept. 23, 1947 |
| 2,431,016 | Andrews | Nov. 18, 1947 |
| 2,443,039 | Johnson | June 8, 1948 |
| 2,491,912 | Walker | Dec. 20, 1949 |